W. O. LUM.
MOTOR CONTROL SYSTEM.
APPLICATION FILED MAR. 21, 1914.
1,196,125. Patented Aug. 29, 1916.
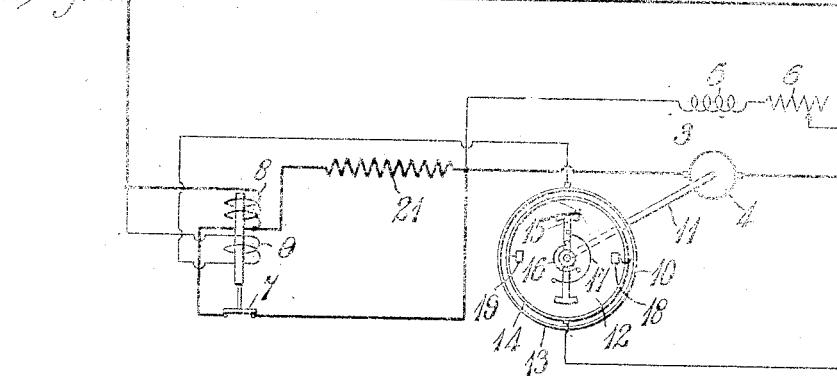
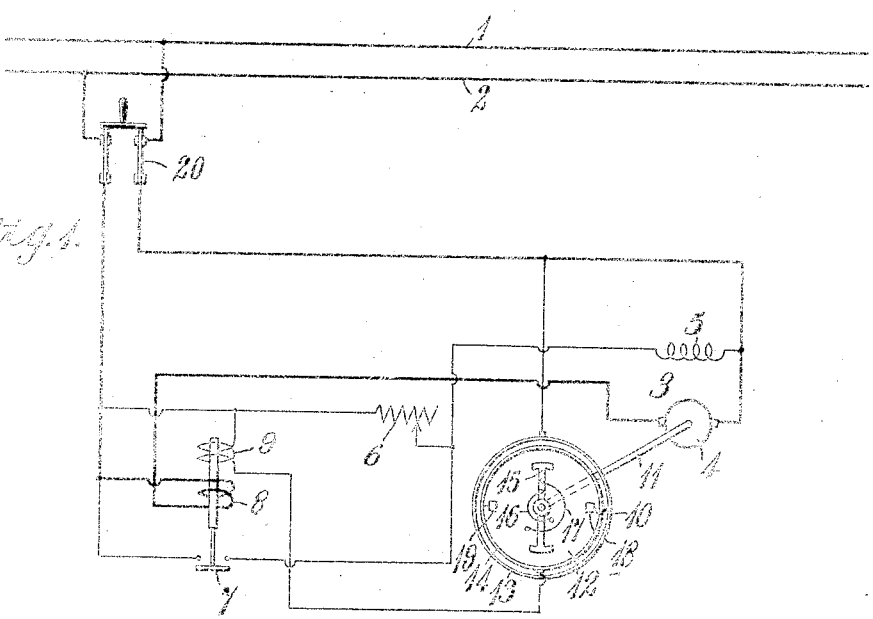
WITNESSES:
INVENTOR
Walter O. Lum
BY
Wesley G. Carr
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,196,125.

Specification of Letters Patent.

Patented Aug. 29, 1916.

Application filed March 21, 1914. Serial No. 826,247.

*To all whom it may concern:*

Be it known that I, WALTER O. LUM, a citizen of the United States, and a resident of Wilkinsburg, in the county of Allegheny and State of Pennsylvania, have invented a new and useful Improvement in Motor-Control Systems, of which the following is a specification.

My invention relates to motor-control systems, and it has for its object to provide a simple and efficient means for automatically controlling the rate of acceleration of an electric motor.

My invention is particularly adapted to be employed in connection with large motors that operate the main rolls in blooming mills or that perform similar services. My invention may be employed also in connection with electric railways to control the rate of acceleration of motor cars or of trains.

I provide a system in which the value of the current supplied to an electric motor during its acceleration is controlled in accordance with its rate of acceleration. A current-limit switch, which controls the current values in a motor circuit, is arranged to operate at either of two values, according to the demands of the mechanical load. An accelerometer is employed to determine the particular value in which the switch operates.

The details of my invention are described in connection with the accompanying drawing in which—

Figure 1 is a diagrammatic view of circuits and apparatus embodying my invention. Fig. 2 is a view, similar to Fig. 1, of a modification of my invention.

Referring particularly to Fig. 1, line conductors 1 and 2, which may be connected to any suitable source, supply energy to an electric motor 3 that is to be controlled. The motor 3 comprises an armature 4 and a shunt field winding 5 that is in series with a resistor 6. A short circuit for the resistor 6 is controlled by an electromagnetic switch 7 that is provided with two actuating coils 8 and 9. The coil 8 is in series with the motor armature and is arranged to normally close the switch 7 at a predetermined value of the current in the motor circuit. The coil 9, which is wound to oppose the coil 7, operates, under certain conditions, to vary the current value at which the switch 7 closes.

The circuit of the coil 9 is controlled by an inertia device 10 that is similar, in principle and in operation, to an accelerometer. The device 10, which is mechanically connected to the motor armature 4 by a shaft 11, comprises a disk 12 that is fixed to the shaft 11 and is provided with collector rings 13 and 14. A double armed lever 15 is rotatably mounted on the shaft 11 and is yieldingly connected to the disk 12 by means of springs 16 and 17. When the motor is being accelerated, the arm 15 changes its position, relatively to the disk 12 because of its inertia and it assumes a position that depends upon the rate of acceleration and the tension of the springs 16 and 17. In one position of the arm 15, it engages contact members 18 and 19, that are respectively connected to the collector rings 13 and 14, to complete the circuit of the coil 9. By properly adjusting the tension of the springs 16 and 17, or by varying the weight of the arms of the lever 15, the rate of acceleration at which the arm 15 will complete the circuit, as above described, may be adjusted.

It may be assumed that the switch 20 has been closed and that the motor 3 is being accelerated. If the motor accelerates at a normal rate, the switch 7 will be controlled by the coil 8 to operate when the current in the motor circuit reaches a value which may be, for example, 100 to 125% of normal full load value. The closing of the switch 7 operates to close a short circuit for the resistor 6 and thereby allow an increased current to traverse the field winding 5. The resultant strengthening of the motor field causes the armature to receive less current and, when the current falls to a value that is less than the predetermined value at which the switch has closed, it will again open to insert the resistor 6 in series with the field winding 5 to accelerate the motor.

If the rate of acceleration be lower than that desired, the arm 15 of the device 10 will complete the circuit of the coil 9, in the manner above described, and the latter will be energized to oppose the action of the coil 8 and thereby increase the current value at which the switch 7 closes. This value may be, for example, 125 to 150% of normal full load value. The result is to increase the rate of acceleration of the motor and, as soon as the rate becomes normal, the circuit of the coil 9 will be broken by the arm 15, and the switch 7 will be controlled by the coil 8 only.

A modification of my invention is illustrated in Fig. 2 in which similar numerals are employed to designate corresponding parts. In the modification, the rate of acceleration is controlled by a resistor 21 that is in series with the armature 4 of the motor. Normally, when the motor 3 is being accelerated at its normal rate, the switch 7, which is normally closed to short circuit the resistor 21, is controlled by the coil 8 alone. If the rate of acceleration fall below the normal value, the arm 15 of the accelerometer will operate to close the circuit of the coil 9, in the manner described above in connection with Fig. 1, and the coil 9 will be energized to oppose the action of the coil 8. The switch 7 will then remain closed until the current has reached a higher predetermined value than when actuated by the coil 8 only. The result is to allow the armature 4 to receive current at a higher value without opening the switch 7 and thereby increase the rate of acceleration of the motor. The operation of the system illustrated in Fig. 2 differs in no other material respect from that of Fig. 1.

It will be noted that I have provided a simple and effective means for controlling the rate of acceleration of an electric motor in accordance with the demands of the load. It will be understood, also, that the values at which the current-limit switch 7 is arranged to operate, may be varied, as desired, by adjusting the coils 8 and 9 and by adjusting the strength of the springs 16 and 17, or the weight and length of the arm 15 of the device 10.

I claim as my invention:

1. In a motor-control system, the combination with a source of current and an electric motor having a shunt field winding, of means controlled by the rate of acceleration of said motor for controlling the excitation of said field winding.

2. In a motor-control system, the combination with a source of current, and an electric motor, of an electromagnetic switch having a plurality of actuating coils for controlling the circuit conditions of said motor, said switch being arranged to operate at a predetermined current value, and means controlled by the rate of acceleration of said motor for controlling the circuit of one of said coils.

3. In a motor-control system, the combination with a source of current and an electric motor, of a switch having a plurality of actuating coils, one of said coils being in circuit with said motor, and means controlled by the rate of acceleration of said motor for controlling the connections of another of said actuating coils.

4. In a motor-control system, the combination with a source of current and an electric motor, of means for automatically controlling the rate of acceleration of said motor, said means comprising an electromagnetic switch having actuating coils that are wound to oppose each other and arranged to operate at a predetermined current value, and means controlled by the rate of acceleration of said motor for controlling the circuit of one of said coils and thereby causing said switch to operate at a second predetermined value.

5. In a motor-control system, the combination with a source of current and an electric motor, of a resistor in circuit with said motor, and means for automatically controlling said resistor, said means comprising an electromagnetic switch having a plurality of actuating coils and means controlled by the rate of acceleration of said motor for controlling the circuit of one of said coils.

6. In a motor control system, the combination with a source of current and an electric motor having a shunt field winding, of a resistor in circuit with said field winding, an electromagnetic switch for controlling said resistor, said switch being adapted to operate when the current in the motor circuit reaches a predetermined value, and means comprising an inertia device mechanically connected to said motor for varying said predetermined value.

7. In a motor control system, the combination with a source of current, and an electric motor, of a resistor in circuit with said motor, and means for automatically controlling said resistor, said means comprising an electromagnetic switch having a plurality of actuating coils and means for closing the circuit of one of said coils when the rate of acceleration of said motor reaches a predetermined minimum value.

In testimony whereof, I have hereunto subscribed my name this 13th day of March, 1914.

WALTER O. LUM.

Witnesses:
W. M. CODDINGTON,
B. B. HINES.